United States Patent [19]

Woods et al.

[11] 4,372,918

[45] Feb. 8, 1983

[54] FLOW THROUGH PRESSURE REACTION APPARATUS

[76] Inventors: Verle W. Woods; Jay A. Woods; Dale G. Woods, all of P.O. Box 1016, Yakima, Wash. 98901

[21] Appl. No.: 194,344

[22] Filed: Oct. 6, 1980

Related U.S. Application Data

[63] Continuation-in-part of Ser. No. 960,952, Nov. 15, 1978, abandoned.

[51] Int. Cl.$^3$ .................. B01J 19/00; E03B 5/00; G05B 9/05
[52] U.S. Cl. .................................. 422/129; 137/566; 422/117; 422/234; 422/242
[58] Field of Search ............... 422/117, 129, 132, 163, 422/188, 189, 207, 208, 226, 234, 235, 236, 242, 148, 112, 218, 223; 417/247; 423/359; 137/566; 55/199

[56] References Cited

U.S. PATENT DOCUMENTS

| | | | |
|---|---|---|---|
| 1,952,021 | 3/1934 | Reed | 422/148 X |
| 2,073,638 | 3/1937 | Houdry | 422/235 X |
| 2,221,799 | 11/1940 | Ittner | 422/129 X |
| 2,332,527 | 10/1943 | Pyzel | 422/235 |
| 2,761,768 | 9/1956 | Diels et al. | 422/235 X |
| 2,893,845 | 7/1959 | Erickson | 422/112 |
| 2,951,746 | 9/1960 | Kouba et al. | 422/163 |
| 2,990,237 | 6/1961 | Bowles et al. | 422/218 X |
| 3,054,660 | 9/1962 | Crooks et al. | 422/148 X |
| 3,557,019 | 1/1971 | Van Driesen | 422/223 X |
| 3,615,200 | 10/1971 | Konoki | 422/148 X |
| 3,704,100 | 11/1972 | Twilley et al. | 55/199 X |
| 3,738,815 | 6/1973 | Pawloski et al. | 422/132 |
| 3,744,977 | 7/1973 | Scott | 422/234 X |

*Primary Examiner*—Richard L. Chiesa
*Attorney, Agent, or Firm*—Wells, St. John & Roberts

[57] ABSTRACT

A flow through pressure reaction apparatus that permits chemical reactions to take place between fluids maintained under pressure as the component fluids are moved from one location to another. The reaction is allowed to take place within an enclosed fluid conduit connected between the discharges of opposed pumps. At least one pump is a non-positive displacement pump that will allow reverse flow of fluid through it in response to increases in fluid pressure within the conduit. One pump receives fluid material and forces it through its discharge into the conduit. A second pump at the opposite end of the conduit receives the material at its discharge. The second pump is operated in opposition to the first pump at a pressure head that is lower than the pressure head of the first pump. A fluid flow will therefore be maintained through the second pump in a direction opposite to the flow it would normally produce because of the differential of the pressure heads of the two pumps.

9 Claims, 2 Drawing Figures

FLOW THROUGH PRESSURE REACTION APPARATUS

RELATED APPLICATION

This is a continuation-in-part of pending application Ser. No. 960,952, filed Nov. 15, 1978, which is abandoned upon filing of this application.

BACKGROUND OF THE INVENTION

The present invention relates broadly to apparatus for containing a chemical reaction and more particularly to such apparatus that facilitates such a reaction under pressure during continuous flow of the component materials.

It is common in various chemical related industries to utilize pressure reaction vessels for containing reactive components. Such pressure tanks are cumbersome and require excessive floor space and special design considerations in plant layout and flow control. The pressure tanks must be designed with sufficient volume to contain the reacting components under all conditions and are expensive because of specialization required in fabrication and pressure testing.

Pressure relief valves and restricted orifices are used in design of pressure vessels for reactions where chemical components are brought together in a directional flow. They are used to maintain vessel pressure and as a safety measure in case of excessive pressure buildup. The nature of such relief valves is that they remain in an inoperative state up to the point where the pressure builds beyond a selected value. When this happens, the valve is intended to open and allow escape of material or air from within the enclosed area, causing the pressure to drop back to a safe level.

In theory, the use of pressure relief valves is entirely satisfactory. In reality, however, such valves are not 100% effective. They are often exposed to materials which can corrode valve material and lock the valves in a closed position.

Unexpected pressure damage or destruction of such vessels or associated equipment is not uncommon, with associated casualties in the adjacent area. It therefore becomes very desirable to provide some form of flow through pressure reaction apparatus that provides a fail-safe pressure relief for volatile reactions while providing controlled dynamic flow of material through a pipe or other conduit to assure more intimate mixing than is possible in more cumbersome, expensive, pressure vessels.

DETAILED DESCRIPTION OF A PREFERRED EMBODIMENT

Figure 1:
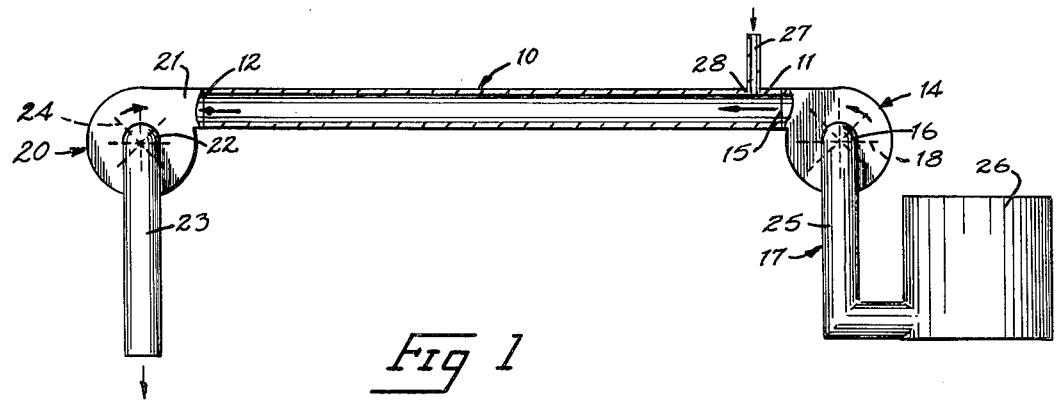
FIG. 1 is a diagrammatic view illustrating the basic features of the present invention.

Before proceeding with the detailed description of a preferred embodiment of my invention, definitions of terms are in order. The term "pump means" is utilized in this specification and claims as a broad term meaning any apparatus utilized for the purpose of producting a directional flow of a flowable material. Therefore, this term would encompass fans, blowers, pressurizing mills and known forms of single or multiple stage pumps including positive displacement pumps. The term "non-positive displacement pump means" is to be taken as any apparatus for pressurizing flowable material and which will also allow flow of material therethrough in a reverse direction. Such non-positive displacement pumps specifically include centrifugal pumps, centrifugal blowers, axial or in-line pumps and blowers, turbines, jet pumps, and other single or multiple stage pumps or blowers that comply with the terms of the above definition. "Fluids" in this context includes all flowable materials, including solids, liquids and gases, as well as mixtures of such materials and all resulting reaction products. The maximum particle sizes accommodated by the apparatus will be governed by physical pump clearances.

The present invention is utilized to facilitate a chemical reaction involving one or more fluids as they are passed in a preferred direction through a conduit as shown at 10. The enclosed reaction chamber is shown as a length of conduit 10, which includes a first open end 11 and a second open end 12. The preferred form of conduit 10 is a common pipe formed of known materials such as a suitable metal alloy, utilized conventionally to pass the desired flowable chemical compounds from one location to another. Thus, in a preferred form the conduit 10 includes ends 11 and 12 that are spaced along the length of the pipe and that may be coaxial with one another. The length, shape and diameter of the reaction chamber or conduit 10 may be selected according to variables such as material flow rate, types of materials, and the type and length of reaction desired.

A first pump means 14 (either positive displacement or non-positive displacement) is shown connected to the first open end 11 of conduit 10. The connection is made at a discharge 15 of the pump means 14. This is a closed fluid connection with the discharge 15 in axial alignment with the remainder of the conduit. Pump means 14 circulates material received from feed means 17 at pump intake 16.

As a specific example, the pump means 14 might be a centrifugal pump, having a series of vanes 18. Material fed through feed means 17 and intake 16 will be driven by rotation of the vanes 18 through the pump discharge 15. The flow rate of material from the discharge 15 may be predetermined according to the type of material and capacity of the pump means 14. The pressure head at which the pump will operate will also have a relatively fixed value.

A second non-positive displacement pump means 20 is situated at the second end 12 of conduit 10. Second pump means 20 includes a discharge 21 connected in fluid communication with the second open conduit end 12. Pump means 20 also includes an intake 22. A product discharge pipe 23 is connected to the intake 22.

The non-positive displacement pump means 20 is also preferably a centrifugal type pump having vanes 24. The pumps 14 and 20 can be identical, with vanes 24 trimmed radially shorter than vanes 18. This will result in a lower pressure head being produced by the second non-positive displacement pump means 20. Pump 20 will offer resistance to flow from pump 14 through the conduit since it is reversed in position and its discharge opposes the discharge of pump 14. Pump 20 will operate at its selected pressure head to produce a relatively continuous operating pressure within the conduit 10 while the fluid being acted on is allowed to flow through it. The fluid will move in conduit 10 from the first end 11 toward the second end 12 in a direction opposite the normal directional flow produced by non-positive displacement pump means 20.

If pump means 14 operates at a pressure head of 92 p.s.i. and the non-positive displacement pump means 20 operates at a pressure head of 90 p.s.i., the resulting pressure produced within the length of conduit 10 will vary between 92 p.s.i. at the first conduit end and 90 p.s.i. at the second conduit end. A flow rate in a reverse direction through the non-positive displacement pump means 20 will result due to the 2 p.s.i. differential between it and pump means 14.

A fluid component to a reaction might be supplied to pump means 14 through a feed means 17. This is shown as a feed pipe 25 leading to intake 16. Pipe 25 might receive flowable material from a source, shown diagrammatically at 26. A second reagent material might be received through a feed pipe 27 shown in FIG. 1 as being connected at a location 28 downstream of pump means 14. Positioning of the feed pipe 27 depends on the nature of reaction desired and of the materials being utilized. Where slow reacting materials are being combined, it may be desirable to add the reactant downstream from or at the intake 16, thereby allowing the reaction to initiate before it enters the conduit 10. Materials that react more quickly may require reactant addition at different locations along conduit 10. Appropriate injection mechanisms (not shown) for fluids or solids that are presently known and available may be supplied in conjunction with the pipe 27 when it is located so as to feed material into the pressurized conduit 10.

Figure 2:
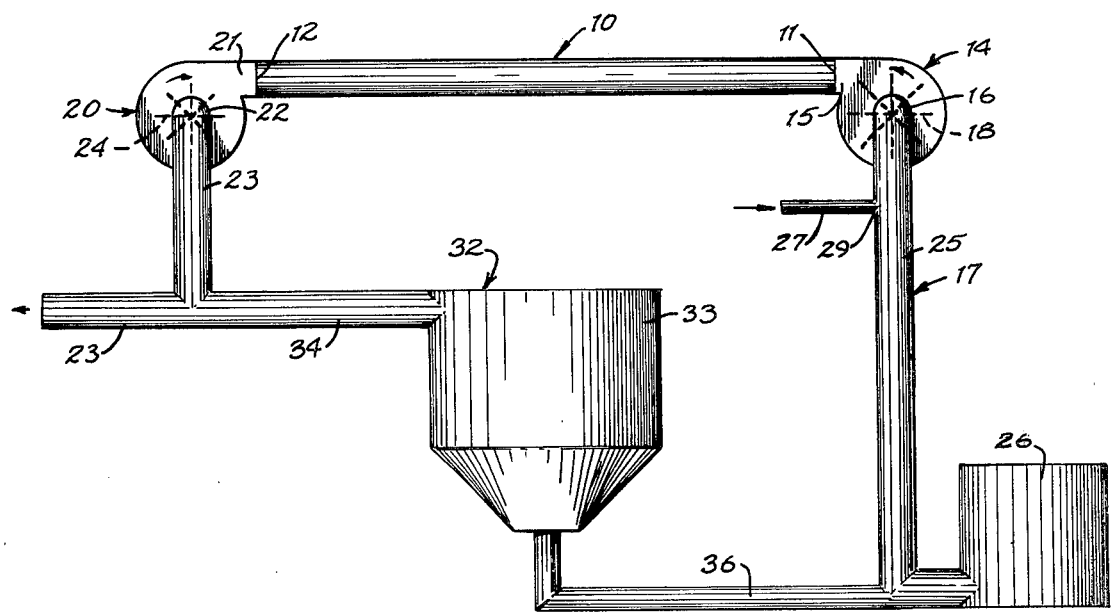
FIG. 2 is a view of the present device utilized in conjunction with a surge hopper and recycling feature.

It might also be desirable to provide some form of recycling mechanism by which the reacting components can be continuously recirculated through the pressure area to effect a complete reaction. For this purpose we provide the fluid recycling means shown generally at 32 in FIG. 2. Means 32 may include a surge hopper or tank 33 with recycling pipe branches 34 and 36 leading from the discharge pipe 23 and into the feed pipe 25. The hopper or tank 33 provides additional volume which may receive surging material from within the conduit 10. The surge material can eventually be redirected through the conduit 10 to complete a reaction or to be delivered under normal conditions through the final discharge 23.

Physical volume surges which might occur due to the reaction within conduit 10 are accommodated by the present arrangement without significant resulting damage. Fluid under excess pressure can escape from conduit 10 past the vanes 24 of the non-positive displacement pump means 20. Pressurized fluid can also escape through a centrifugal or other non-positive displacement pump if utilized as pump means 14. If a positive displacement pump is situated at the conduit end 11, escape of material can occur only through the non-positive displacement pump means 20. Even so, depending upon the type of materials producing the reaction, a safe escape route for expanding gases and other fluids may be supplied without endangering equipment or personnel in the vicinity.

The pressure relief feature provided by pumps 14 and 20 is fail-safe. A pressure escape route through the non-positive pump will exist whether the pump is operative or not. However, it is unlikely that pressure surges could take place without both pumps being operative since there could be no prescribed pressure buildup in conduit 10.

The reaction chamber available in conduit 10 constitutes a dynamic pressure enclosure for reactions of any type which occur between two or more flowable materials. The reactions can be either exothermic or endothermic. It is ideal for continuous reaction systems involving slurries. It can handle resulting solid or liquid precipitates by maintaining constant flow and movement of materials before, during, and after the reaction occurs in a continuous system.

The apparatus is to be contrasted to a conventional static vessel or system, which is batch oriented. Such systems typically use positive displacement pumps for pressurization of a vessel and maintain such pressures by outlet retrictions, valves or orifices which are subject to material damage and clogging. It is difficult to accurately control output of material in such systems. Where large surges and possibly explosive pressures might be experienced, excess volume capacity and heavy vessel walls are often required. Flow and pressure typically have a linear relationship in such systems and will be directly proportional to one another.

The present dynamic system assures constant movement of the reacting materials, keeping them mixed and flowable. It cannot become clogged or plugged. Pump operation is insensitive to corrosion and abrasion when using non-positive displacement pumps. Surges and explosive pressures are immediately vented from the reaction chamber through one or both pressurizing pumps, permitting use of lighter chamber walls and eliminating the need for pressure relief valves. This system provides a non-linear relationship between flow and pressure since it makes it easy to hold accurate pressure settings for all flow conditions. Blowers and centrifugal pumps assure continuous, even pressurization of fluids, rather than the pulsating variations encountered in the use of positive displacement pumps.

The reactor chamber can be oriented in any position and can have any desired size or shape. It can be heated or cooled at its exterior by a surrounding jacket or other heat exchanger. A series of such reactors can be used when needed, each operating under a different temperature and/or pressure. Where the reactor chamber is elongated or coiled, reactions can occur at different temperatures along its length. This can favor different reactions at identifiable stages.

Additional reactants can be inserted into the system at any point prior to the pumps, in the reactor chamber or in the pump casings themselves. Suspended catalysts can be included in the system and can be removed at subsequent locations along the flow path.

The system offers excellent gas and foam control for products formed during the reactions and that would otherwise be difficult to manage during depressurization through small restricted outlets. Since flow through the reactor is continuous, only small quantities of material must be handled at any given time. Besides reducing volume and size requirements for the apparatus, pressure reduction at the surge tank is practical and controllable.

It is to be noted that the above description and drawings are given merely as examples to disclose a preferred form of the present invention. They are not intended to limit the scope of our invention which is set forth only by the following claims.

What we claim is:

1. A flow-through pressure reaction apparatus, comprising:
   an enclosed reaction chamber having first and second open ends;
   a source of fluid;

first pump means having an inlet and a discharge;

fluid feed means operatively connected between the source of fluid and the inlet of said first pump means for directing a stream of fluid from said source to said first pump means in response to operation of said first pump means;

said first pump means having its discharge connected in closed fluid communication with said first open end of said reaction chamber for discharging the stream of fluid into said first open end at a first pressure head in response to operation of said first pump means;

second non-positive displacement pump means having an inlet and a discharge;

said second pump means having its discharge connected in closed fluid communication with said second open end of said reaction chamber for opposing movement of the stream of fluid within it by imparting to the fluid a second pressure head in response to operation of said second pump means, the value of said second pressure head being less than that of said first pressure head;

whereby simultaneous operation of said first and second pump means imparts flow to the stream of fluid from said first open end to said second open end of the reaction chamber due to the pressure head differential between said ends and such flow can be accommodated by passage of fluid through said second pump means.

2. The apparatus as set out in claim 1 wherein said first pump means comprises a non-positive displacement pump.

3. The apparatus as set out in claim 1 further comprising:

fluid recycling means operatively connected between the inlet of said second pump means and the inlet of said first pump means for directing fluid from said second pump means to said first pump means in response to simultaneous operation of said first and second pump means.

4. The apparatus as set out in claim 1 further comprising:

fluid recycling means operatively connected between the inlet of said second pump means and the inlet of said first pump means for directing fluid from said second pump means to said first pump means in response to simultaneous operation of said first and second pump means;

and a surge hopper interposed within said fluid recycling means.

5. The apparatus as defined by claim 1 wherein said feed means includes a primary in-feed pipe leading to the inlet of said first pump means and a reaction fluid feed pipe joining the primary in-feed pipe upstream of the said first pump means.

6. The apparatus as defined by claim 1 wherein said feed means includes a reaction fluid feed pipe opening into said reaction chamber downstream of its first open end.

7. The apparatus as defined by claim 1 wherein said first pump means and said second non-positive displacement pump means are each centrifugal pumps.

8. The apparatus as defined by claim 1 wherein said reaction chamber is comprised of a length of standard fluid receiving pipe having first and second open ends axially spaced apart.

9. The apparatus as defined by claim 1 wherein said first pump means is comprised of a centrifugal pump having impeller vanes of a prescribed effective length and wherein said second non-positive displacement pump means is comprised of a centrifugal pump having impeller vanes of an effective length less than the prescribed effective length.

* * * * *